E. J. MEIER.
ANCHOR.
APPLICATION FILED AUG. 24, 1920.
1,414,992.
Patented May 2, 1922.
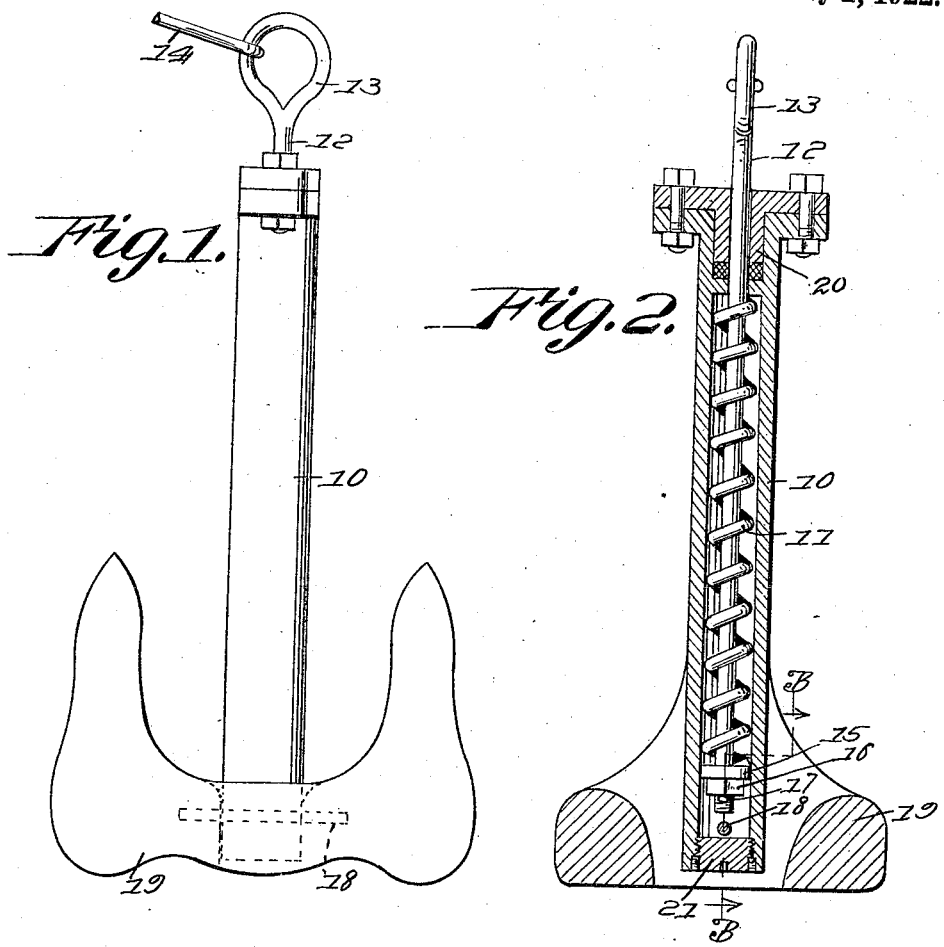
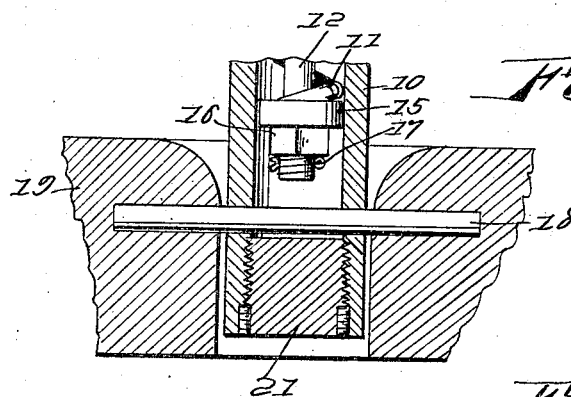
Eric J. Meier, Inventor

UNITED STATES PATENT OFFICE.

ERIC J. MEIER, OF DORCHESTER, MASSACHUSETTS.

ANCHOR.

1,414,992. Specification of Letters Patent. Patented May 2, 1922.

Application filed August 24, 1920. Serial No. 405,597.

*To all whom it may concern:*

Be it known that I, ERIC J. MEIER, a citizen of the United States of America, residing at Dorchester, in the State of Massachusetts, have invented new and useful Improvements in Anchors, of which the following is a specification.

The object of the invention is to provide a construction of anchor suitable for watercraft whereby the strain upon the anchor and the anchor chain or cable is relieved or cushioned to minimize the risk of dragging the anchor or of breaking the chain or cable or of the anchor flukes by reason of the pitching or rolling of the craft, and to this end the invention consists in the construction and combination of parts of which a preferred embodiment is shown in the drawing, wherein:

Figure 1 is a side view of the anchor.

Figure 2 is a central sectional view of the same.

Figure 3 is a detail section of the lower end of the anchor shank on the plane indicated by the line 3—3 of Figure 2.

The structure embodies an anchor shank 10 which is of tubular form serving as a housing for a coiled spring 11 through which extends an attaching rod 12 provided at its outer end with an eye 13 for engagement with the end of the anchor chain or cable 14 and fitted at its inner end with a washer 15 and nut 16, the accidental displacement of which may be prevented by a cotter 17. Through the lower or inner end of the shank extends a pivot pin 18 for the pivotal attachment of the anchor head 19 thereto, and at its upper or inner end the bore of the shank is closed by a stuffing box 20 through which extends the attaching rod to permit of the reciprocatory movement of the latter without admitting water to the interior of the shank. The lower end of the shank may also be fitted with a removable cap 21.

In operation, as will be obvious, the strains applied to the anchor chain or cable by the movement of the craft will be cushioned by the spring resisted movement of the attaching rod to minimize the risk of injury either to the anchor head or cable and the tendency of the anchor to drag and thus permit the drifting of the vessel.

Having described the invention, what I claim as new and useful is:

An anchor having a tubular shank to which the head is pivotally connected, a cable or chain attaching rod extending axially through the bore of the shank, a coiled spring housed in the shank, said attaching rod being provided at its outer end with an eye for engagement by an anchor chain or cable and at its inner end with a nut for terminal contact with said spring, a stuffing box closing the upper end of the shank and forming a guide for the attaching rod, and a removable cap closing the inner end of the bore of the shank.

In testimony whereof he affixes his signature.

ERIC J. MEIER.